(12) United States Patent
Buckel et al.

(10) Patent No.: US 7,442,430 B2
(45) Date of Patent: Oct. 28, 2008

(54) UV-STABILIZED POLYCARBONATE MOLDINGS

(75) Inventors: Frank Buckel, Krefeld (DE); Gunther Stollwerck, Krefeld (DE); Robert Maleika, Dusseldorf (DE)

(73) Assignee: Bayer MaterialScience AG, Leverkusen (DE)

( * ) Notice: Subject to any disclaimer, the term of this patent is extended or adjusted under 35 U.S.C. 154(b) by 43 days.

(21) Appl. No.: 11/401,042

(22) Filed: Apr. 10, 2006

(65) Prior Publication Data
US 2006/0234061 A1 Oct. 19, 2006

(30) Foreign Application Priority Data
Apr. 13, 2005 (DE) .................. 10 2005 017 023

(51) Int. Cl.
B32B 27/06 (2006.01)
B32B 27/08 (2006.01)
B32B 27/18 (2006.01)
B32B 27/30 (2006.01)
B32B 27/36 (2006.01)

(52) U.S. Cl. .................. 428/215; 428/213; 428/332; 428/337; 428/339; 428/412; 428/483; 428/522

(58) Field of Classification Search .................. None
See application file for complete search history.

(56) References Cited

U.S. PATENT DOCUMENTS

| | | | |
|---|---|---|---|
| 4,313,979 A * | 2/1982 | Frye et al. | 427/387 |
| 4,478,876 A * | 10/1984 | Chung | 427/515 |
| 5,001,177 A | 3/1991 | Winfried et al. | 524/86 |
| 5,061,558 A | 10/1991 | Fischer et al. | 428/332 |
| 5,108,835 A | 4/1992 | Hähnsen et al. | 428/334 |
| 5,288,778 A * | 2/1994 | Schmitter et al. | 524/100 |
| 5,783,307 A * | 7/1998 | Fagerburg et al. | 428/412 |
| 5,891,942 A * | 4/1999 | Parish et al. | 524/284 |
| 6,060,543 A * | 5/2000 | Bolle et al. | 524/100 |
| 6,191,199 B1 * | 2/2001 | Renz et al. | 524/100 |
| 6,225,384 B1 * | 5/2001 | Renz et al. | 524/100 |
| 6,255,483 B1 * | 7/2001 | Fletcher et al. | 544/216 |
| 6,333,114 B1 | 12/2001 | Tobita et al. | 428/412 |
| 6,468,958 B1 * | 10/2002 | Fletcher et al. | 510/513 |
| 6,620,509 B1 * | 9/2003 | Yamamoto et al. | 428/412 |
| 6,696,143 B1 * | 2/2004 | La Point | 428/216 |
| 6,841,670 B2 * | 1/2005 | Fletcher et al. | 544/216 |
| 6,919,454 B2 * | 7/2005 | Fletcher et al. | 544/216 |
| 7,070,859 B2 * | 7/2006 | Imanaka et al. | 428/412 |
| 2001/0039341 A1 * | 11/2001 | Fletcher et al. | 544/214 |
| 2002/0083641 A1 * | 7/2002 | Leppard et al. | 47/29.4 |
| 2003/0045444 A1 * | 3/2003 | Fletcher et al. | 510/307 |
| 2003/0236327 A1 * | 12/2003 | Leppard et al. | 524/100 |
| 2004/0209020 A1 | 10/2004 | Castiglione et al. | 428/34 |
| 2005/0019281 A1 * | 1/2005 | Fletcher et al. | 424/59 |
| 2005/0031855 A1 | 2/2005 | Heuer et al. | 428/332 |
| 2005/0059758 A1 | 3/2005 | Leppard et al. | 524/100 |
| 2005/0084663 A1 * | 4/2005 | Gorny et al. | 428/216 |
| 2007/0237967 A1 * | 10/2007 | Buckel et al. | 428/423.1 |

FOREIGN PATENT DOCUMENTS

| | | | |
|---|---|---|---|
| EP | 110 221 B1 | | 4/1987 |
| EP | 1 033 243 | * | 9/2000 |
| EP | 1 308 084 A1 | | 5/2003 |
| GB | 2 290 745 A | | 1/1996 |
| JP | 2000-327802 | * | 11/2000 |

OTHER PUBLICATIONS

Database WPI Section Ch, Week 200127 Derwent Publications Ltd., London, GB.
An 2001-260217 XP002389785 & JP 2000 327802 A (Mitsubishi Rayon Co Ltd) Nov. 28, 2000.

* cited by examiner

*Primary Examiner*—Vivian Chen
(74) *Attorney, Agent, or Firm*—Connolly Bove Lodge & Hutz LLP

(57) ABSTRACT

A multi-layered product in the form of sheet, film or a three dimensional molded article is disclosed. The product comprised a first layer (A) having a thickness of 1 μm to 2 mm containing polyalkyl (meth)acrylate and 0.01 to 20 percent relative to the weight of said first layer of a UV stabilizer and a second layer (B) that contains polycarbonate. The stabilizer conforms to formula (I)

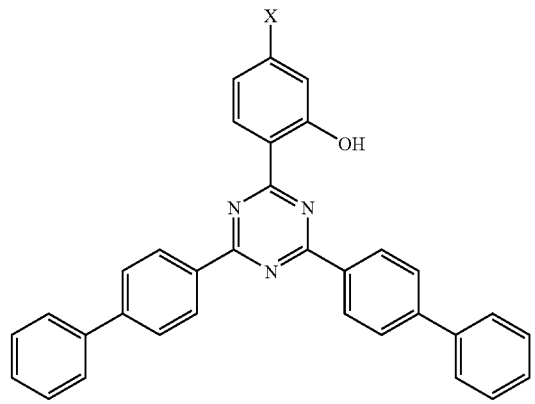

(I)

wherein X denotes $OR^1$; $OCH_2CH_2OR^1$; $OCH_2CH(OH)CH_2OR^1$ or $OCH(R^2)COOR^3$, $R^1$ is branched or unbranched $C_1$-$C_{13}$ alkyl, $C_2$-$C_{20}$ alkenyl, $C_6$-$C_{12}$ aryl or —CO—$C_1$-$C_{18}$ alkyl, $R^2$ is H or branched or unbranched $C_1$-$C_8$ alkyl, and $R^3$ is $C_1$-$C_{12}$ alkyl; $C_2$-$C_{12}$alkenyl or $C_5$-$C_6$ cycloalky. The product is characterized by its optical transparency and resistance to yellowing and is most suitable for glazing applications.

21 Claims, No Drawings

UV-STABILIZED POLYCARBONATE MOLDINGS

FIELD OF THE INVENTION

The present invention concerns a multi-layer product, and more particularly to a product containing a UV protecting polymerized alkyl (meth)acrylate layer including a UV-stabilizer and a polycarbonate layer.

TECHNICAL BACKGROUND OF THE INVENTION

Polycarbonate moldings have long been known. The disadvantage of polycarbonate, however, is that it is not itself inherently UV-resistant. The sensitivity curve of bisphenol A polycarbonate exhibits the highest sensitivity between 320 nm and 330 nm. Below 300 nm no solar radiation reaches the earth, and above 350 nm this polycarbonate is so resistant that no further yellowing occurs.

To protect polycarbonate from the damaging influence of UV rays in the atmosphere, UV stabilizers are generally used which absorb UV radiation and convert it to harmless thermal energy.

It is advantageous for a lasting protection if the damaging UV radiation is effectively filtered out even before it reaches the polycarbonate surface, as is possible through the use of UV protection layers, for example coextruded layers containing UV absorbers, films containing UV absorbers or varnish (or paint respectively as an equivalent expression) containing UV absorbers, on polycarbonate.

Typical classes of UV absorbers which are known to be suitable for use for this purpose, are 2-hydroxybenzophenones, 2-(2-hydroxyphenyl)benzotriazoles, 2-(2-hydroxyphenyl)-1,3,5-triazines, 2-cyanoacrylates and oxalanilides.

The art relating to multi-layer products is noted to include the following.

EP-A 0 110 221 discloses sheets comprising two layers of polycarbonate, wherein one layer contains at least 3 wt. % of a UV absorber. According to EP-A 0 110 221 these sheets can be produced by coextrusion.

EP-A 0 320 632 discloses moldings made from two layers of thermoplastics, preferably polycarbonate, wherein one layer contains special substituted benzotriazoles as UV absorbers. EP-A 0 320 632 also discloses the production of these moldings by coextrusion.

EP-A 0 247 480 discloses multi-layer sheets in which, in addition to one layer of thermoplastics, a layer of branched polycarbonate is present, wherein the polycarbonate layer contains special substituted benzotriazoles as UV absorbers. The production of these sheets by coextrusion is likewise disclosed.

EP-A 0 500 496 discloses polymer compositions which are stabilized with special triazines against UV light and their use as an outer layer in multi-layer systems. Polycarbonate, polyesters, polyamides, polyacetals, polyphenylene oxide and polyphenylene sulfide are cited as polymers.

It has been found, however, that for many applications, particularly for outdoor applications requiring long-term optical clarity, such as glazing applications, the known UV-stabilised polycarbonate moldings display a still unsatisfactory long-term resistance to yellowing.

For such applications a polycarbonate molding must not yellow by more than $\Delta$ YI of 3 (YI=Yellowness Index) under irradiation of 30 MJ/m$^2$ at 340 nm (corresponding to 10 years' outdoor weathering in Florida).

Weathering in this test is carried out in an Atlas Ci 5000 Weatherometer with a radiation intensity of 0.75 W/m$^2$/mn at 340 nm and a dry/rain cycle of 102:18 minutes. The blackboard temperature is 70° C., the sample chamber temperature 55° C. and the air humidity 40%.

The object of the present invention is to provide polycarbonate moldings which under irradiation of 30 MJ/m$^2$ at 340 nm yellow by no more than a $\Delta$ YI of 3 under the cited conditions. It was found that in order to achieve this combination of UV absorber and matrix must have an adequate absorbance and low degradation.

SUMMARY OF THE INVENTION

A multi-layered product in the form of sheet, film or a three dimensional molded article is disclosed. The product comprised a first layer (A) having a thickness of 1 μm to 2 mm containing polymerized alkyl (meth)acrylate and 0.01 to 20 percent relative to the weight of said first layer of a UV stabilizer and a second layer (B) that contains polycarbonate. The stabilizer conforms to formula (I)

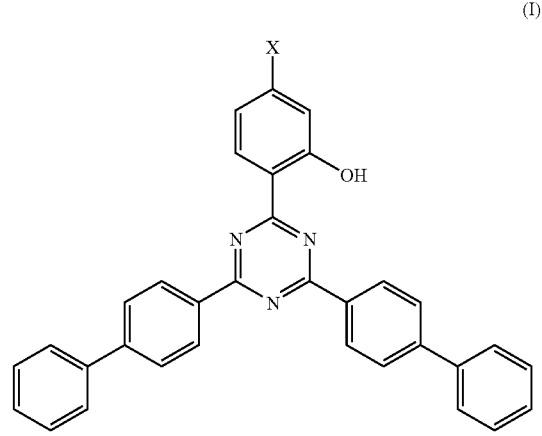

wherein X denotes OR$^1$; OCH$_2$CH$_2$OR$^1$; OCH$^2$CH(OH)CH$_2$OR$^1$ or OCH(R$^2$)COOR$^3$, R$^1$ is branched or unbranched C$_1$-C$_{13}$ alkyl, C$_2$-C$_{20}$ alkenyl, C$_6$-C$_{12}$ aryl or —CO—C$_1$-C$_{18}$ alkyl, R$^2$ is H or branched or unbranched C$_1$-C$_8$ alkyl, and R$^3$ is C$_1$-C$_{12}$ alkyl; C$_2$-C$_{12}$ alkenyl or C$_5$-C$_6$ cycloalky. The product is characterized by its optical transparency and resistance to yellowing and is most suitable for glazing applications.

DETAILED DESCRIPTION OF THE INVENTION

This object is surprisingly achieved by a multi-layer product comprising a first layer (A) and a second layer (B), wherein the first layer (A) is a UV protection layer containing polymerized alkyl (meth)acrylate, which contains a UV stabilizer according to formula (I), and the second layer (B) contains a polycarbonate. The UV protection layer (A) may be in the form of a film, a coextruded layer or a cured clear varnish layer.

The present invention provides this multi-layer product.

The multi-layer product according to the invention may comprise further layers, in particular a further UV protection layer (C), which is likewise a polymerized alkyl (meth)acrylate layer which contains a UV stabilizer according to formula (I) and which may be in the form of a film, a coextruded layer or a cured varnish layer. The layer sequence in this case is (A)-(B)-(C), and layers (A) and (C) may have the same or different compositions.

The UV absorber used in layers (A) and optionally (C) of the multi-layer products according to the invention has the general formula (I)

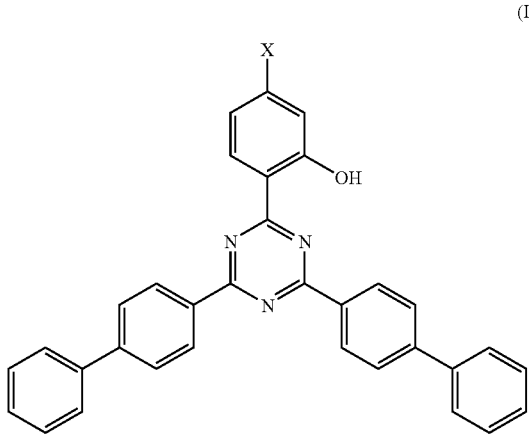

(I)

wherein X denotes $OR^1$; $OCH_2CH_2OR^1$; $OCH^2CH(OH)CH_2OR^1$ or $OCH(R^2)COOR^3$, wherein $R^1$ stands for branched or unbranched $C_1$-$C_{13}$ alkyl, $C_2$-$C_{20}$ alkenyl, $C_6$-$C_{12}$ aryl or —CO—$C_1$-$C_{18}$ alkyl, $R^2$ is H or branched or unbranched $C_1$-$C_8$ alkyl, and $R^3$ denotes $C_1$-$C_{12}$ alkyl; $C_2$-$C_{12}$ alkenyl or $C_5$-$C_6$ cycloalkyl.

For UV protection layers (A) and (C) in the form of films or coextruded layers, X is preferably $OR^1$; particularly preferably with $R^1$=$CH_2CH(CH_2CH_3)C_4H_9$.

For UV protection layers in the form of cured paint formulations, X is preferably $OCH(R^2)COOR^3$; particularly preferably with $R^2$=$CH_3$ and $R^3$=$C_8H_{17}$.

Such biphenyl-substituted triazines having the general formula I are known from WO 96/28431; DE 197 39 797; WO 00/66675; US 6225384; US 6255483; EP 1 308 084 and FR 2812299 all incorporated herein be reference.

UV protection layers (A) and optional (C) in the form of cured varnish formulations contain as binder a physically drying polyalkyl (meth)acrylate resin containing preferably methyl methacrylate or methylacrylate as the main component and optionally a further alkyl (meth)acrylate having a longer, linear or branched alkyl chain (—$C_nH_{2n+1}$ with n>1), preferably 1≦n≦10, particularly preferably linear with n=3 (butyl methacrylate). In particular the ratio of the two methacrylate units is 75 to 100% methyl methacrylate and 25 to 0% alkyl methacrylate, preferably 85 to 100% methyl methacrylate and 15% to 0% alkyl methacrylate, particularly preferably 90 to 100% methyl methacrylate and 10% to 0% alkyl methacrylate.

Physically drying polyalkyl (meth)acrylate resin in the context of the present invention means that the solvent is evaporated whereby no chemical reaction takes place during the curing step.

UV protection layers (A) and (C) according to the invention in the form of films and coextruded layers contain as polymer matrix a polyalkyl (meth)acrylate containing alkyl (meth)acrylate, preferably having alkyl chain lengths of below 10 carbon atoms (—$C_nH_{2n+1}$ with n<10), particularly preferably exclusively with n=1 (methyl methacrylate).

Since a minimum absorbance of the UV protection layer is required for lasting UV protection, the necessary UV absorber concentration depends on the film thickness.

For layer thicknesses of 1 to 100 μm, preferably 1 to 30 μm, particularly preferably 1 to 10 μm, the UV protection layers according to the invention in the form of cured paint formulations contain 0.5 to 20 wt. %, preferably 1 to 15 wt. %, particularly preferably 1.5 to 10 wt. %, relative to the solids content of the varnish formulation, of UV absorber having formula (I), wherein formulations having layer thicknesses after application and curing of 1 μm contain at least 10 wt. %, preferably ≧15 wt. %, those of 5 μm at least 2 wt. %, preferably ≧3 wt. %, and those of 10 μm at least 1 wt. %, preferably ≧1.5 wt. %, whereby the maximum content of the UV absorber is given above.

For layer thicknesses of 1 to 500 μm, preferably 1 to 100 μm, particularly preferably 2 to 50 μm, the UV protection layers according to the invention in the form of coextruded layers contain 0.05 to 20 wt. %, preferably 0.1 to 15 wt. %, particularly preferably 0.5 to 10 wt. %, of UV absorber having formula (I), wherein coextruded layers having a layer thickness of 2 μm contain at least 10 wt. %, preferably ≧15 wt. %, those of 10 μm at least 2 wt. %, preferably ≧3 wt. %, and those of 30 μm at least 0.7 wt. %, preferably ≧1 wt. %, whereby the maximum content of the UV absorber is given above.

For layer thicknesses of 2 μm to 2 mm, preferably 50 μm to 1 mm, particularly preferably 80 μm to 500 μm, the UV protection layers according to the invention in the form of films contain 0.01 to 20 wt. %, preferably 0.02 to 5 wt. %, particularly preferably 0.04 to 2 wt. %, of UV absorber having formula (I), wherein films having a layer thickness of 80 μm contain at least 0.25 wt. %, preferably ≧0.4 wt. %, those of 200 μm at least 0.1 wt. %, preferably ≧0.15 wt. %, and those of 500 μm at least 0.04 wt. %, preferably ≧0.06 wt. %, whereby the maximum content of the UV absorber is given above.

That means the thicker the layer (A) the less UV-absorber is needed.

A further stabilization of the UV protection layer may be achieved by using, in addition to the biphenyl-substituted triazines, in other words the actual UV absorbers, so-called HALS (Hindered Amine Light Stabilizer) systems having the general formula (II).

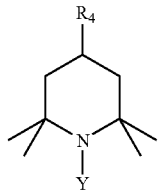

wherein Y represents H; $R^1$ or $OR^1$ and $R^1$ has the same meaning as in formula (I)

$R^4$ consists of: $Z-R^5-Z-R^6$;

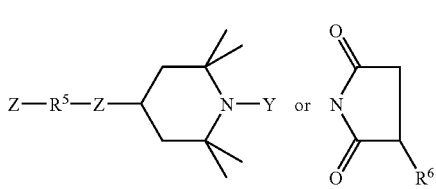

giving rise to the following formula,

Formula IIa

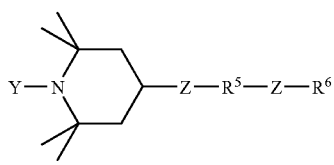

Formula IIb

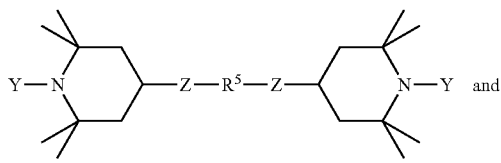

and

Formula IIc

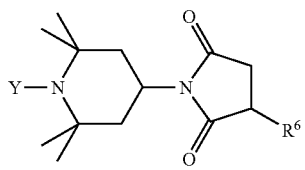

wherein
Z is a divalent functional group such as COO; NH or NHCO
$R^5$ is a divalent organic radical such as $(CH_2)_n$ with n=0 to 12; C=CH-Ph-OCH$_3$;

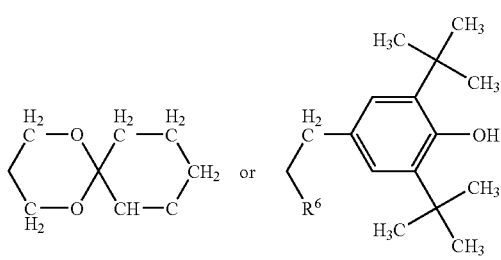

$R^6$ is H or $C_1$-$C_{20}$alkyl
for UV protection layers in the form of cured varnish formulations Y=OR$^1$ and $R^4$=

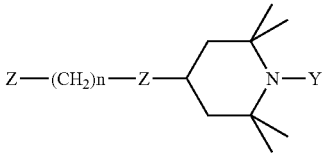

is preferred
Y=OR$^1$ where $R^1$=$C_1$-$C_{13}$ alkyl and $R^4$=

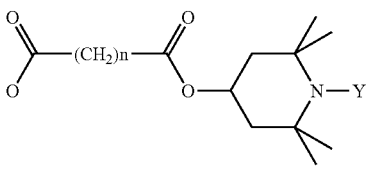

is particularly preferred
giving rise to

Formula IId

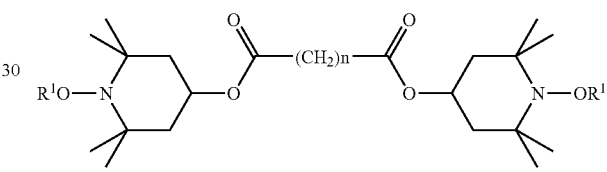

The UV protection layers according to the invention in the form of cured paint formulations contain 0 to 5 wt. %, preferably 0 to 3 wt. %, particularly preferably 0.5 to 2 wt. %, of the compound having formula (II) relative to the solids content of the paint formulation. If the particularly preferred amount of the particularly preferred HALS system (II) is used, the necessary amount of UV absorber (I) is reduced to preferably ≧10 wt. % with a layer thickness after application and curing of 1 μm, preferably ≧2 wt. % for 5 μm and preferably ≧1 wt. % for 10 μm.

In the case also of UV protection layers in the form of coextruded layers or films, HALS systems may be used in quantities of 0 to 3 wt. %. In this case, however, due to the higher processing temperatures, higher molecular weight HALS systems are preferred, wherein the functional group

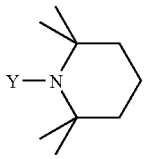

having the general formula II is included more than twice per molecule.

Higher molecular weight HALS systems are particularly preferred wherein the weight loss at 300° C. determined by TGA with a heating rate of 20° C. per minute in air is ≦3 wt. %, as is the case for example with Chimassorb 119 from Ciba Specialty Chemicals (formula IIe)

Formula IIe

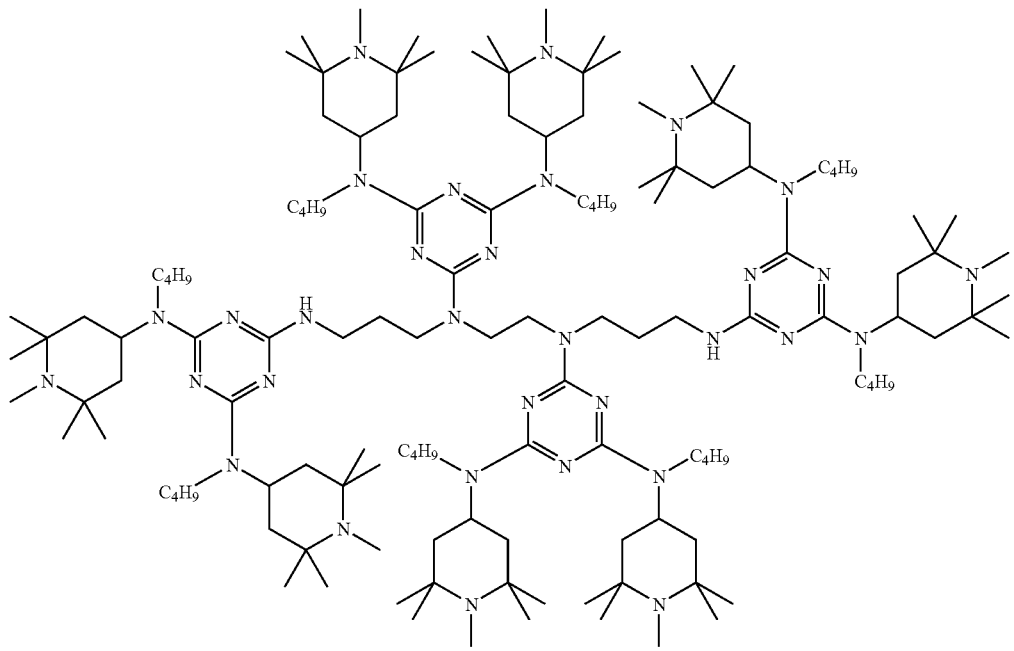

Suitable polycarbonates for the second layer (B) of the multi-layer products according to the invention are all known polycarbonates; these may be homopolycarbonates, copolycarbonates and thermoplastic polyestercarbonates. They preferably have weight average molecular weights ($\overline{M}_w$) of 18,000 to 40,000, preferably 22,000 to 36,000 and in particular 24,000 to 33,000, determined by measuring the relative solution viscosity in dichloromethane or in mixtures having equal amounts by weight of phenol/o-dichlorobenzene calibrated by light scattering.

With regard to the manufacture of polycarbonates, reference is made by way of example to "Schnell, Chemistry and Physics of Polycarbonates, Polymer Reviews, Vol. 9, Interscience Publishers, N.Y., London, Sydney 1964", and to "D.C. PREVORSEK, B.T. DEBONA and Y. KESTEN, Corporate Research Center, Allied Chemical Corporation, Moristown, N.J. 07960, 'Synthesis of Poly(ester)carbonate Copolymers' in Journal of Polymer Science, Polymer Chemistry Edition, Vol. 19, 75-90 (1980)", and to "D. Freitag, U. Grigo, P. R. Müller, N. Nouvertne, BAYER A G, 'Polycarbonates' in Encyclopedia of Polymer Science and Engineering, Vol. 11, Second Edition, 1988, pages 648-718" and finally to "Drs U. Grigo, K. Kircher and P. R. Müller 'Polycarbonate' in Becker/Braun, Kunststoff-Handbuch, Volume 3/1, Polycarbonate, Polyacetale, Polyester, Celluloseester, Carl Hanser Verlag Munich, Vienna 1992, pages 117-299".

Production of the polycarbonates is preferably performed by the interfacial polycondensation process or the melt interesterification process and is described below using the interfacial polycondensation process by way of example.

The compounds preferably used as starting compounds are bisphenols having the general formula

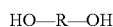

wherein R is a divalent organic radical having 6 to 30 carbon atoms and containing one or more aromatic groups.

Examples of such compounds are bisphenols belonging to the group of dihydroxydiphenyls, bis(hydroxyphenyl) alkanes, indane bisphenols, bis(hydroxyphenyl) ethers, bis (hydroxyphenyl) sulfones, bis(hydroxyphenyl) ketones and α,α'-bis(hydroxyphenyl) diisopropyl benzenes.

Particularly preferred bisphenols belonging to the previously cited groups of compounds are bisphenol A, tetraalkyl bisphenol A, 4,4-(meta-phenylene diisopropyl) diphenol (bisphenol M), 4,4-(para-phenylene diisopropyl) diphenol, 1,1-bis-(4-hydroxyphenyl)-3,3,5-trimethyl cyclohexane (BP-TMC) and optionally mixtures thereof.

The bisphenol compounds for use according to the invention are preferably reacted with carbonic acid compounds, in particular phosgene, or in the case of the melt interesterification process with diphenyl carbonate or dimethyl carbonate.

Polyester carbonates are preferably obtained by reacting the previously cited bisphenols, at least one aromatic dicarboxylic acid and optionally carbonic acid equivalents. Suitable aromatic dicarboxylic acids are for example phthalic acid, terephthalic acid, isophthalic acid, 3,3'- or 4,4'-diphenyldicarboxylic acid and benzophenone dicarboxylic acids. A part, up to 80 mol %, preferably from 20 to 50 mol %, of the carbonate groups in the polycarbonates may be replaced by aromatic dicarboxylic acid ester groups.

Examples of inert organic solvents used in the interfacial polycondensation process are dichloromethane, the various dichloroethanes and chloropropane compounds, tetrachloromethane, trichloromethane, chlorobenzene and chlorotoluene, chlorobenzene or dichloromethane or mixtures of dichloromethane and chlorobenzene preferably being used.

The interfacial polycondensation reaction may be accelerated by catalysts such as tertiary amines, in particular N-alkyl piperidines or onium salts. Tributylamine, triethylamine and N-ethyl piperidine are preferably used. In the melt interesterification process the catalysts cited in DE-A 4 238 123 are preferably used.

The polycarbonates may be deliberately branched in a controlled manner by the use of small quantities of branching agents. Some suitable branching agents are: phloroglucinol, 4,6-dimethyl-2,4,6-tri-(4-hydroxyphenyl) heptene-2; 4,6-dimethyl-2,4,6-tri-(4-hydroxyphenyl) heptane; 1,3,5-tri-(4-hydroxyphenyl) benzene; 1,1,1-tri-(4-hydroxyphenyl) ethane; tri-(4-hydroxyphenyl) phenyl methane; 2,2-bis-[4,4-bis-(4-hydroxyphenyl) cyclohexyl] propane; 2,4-bis-(4-hydroxyphenyl isopropyl) phenol; 2,6-bis-(2-hydroxy-5'-methylbenzyl)-4-methylphenol; 2-(4-hydroxyphenyl)-2-(2,4-dihydroxyphenyl) propane; hexa-(4-(4-hydroxyphenyl isopropyl) phenyl) orthoterephthalic acid ester; tetra-(4-hydroxyphenyl) methane; tetra-(4-(4-hydroxyphenyl isopropyl) phenoxy) methane; α,α',α''-tris-(4-hydroxyphenyl)-1,3,5-triisopropyl benzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4,4''-dihydroxytriphenyl)methyl) benzene and in particular: 1,1,1-tri-(4-hydroxyphenyl) ethane and bis-(3-methyl-4-hydroxyphenyl)-2-oxo-2,3-dihydroindole.

The 0.05 to 2 mol % of branching agents or mixtures of branching agents that may optionally be incorporated, relative to diphenols used, may be added together with the diphenols but may also be added at a later stage of the synthesis.

Phenols such as phenol, alkyl phenols such as cresol and 4-tert-butyl phenol, chlorophenol, bromophenol, cumyl phenol or mixtures thereof are preferably used as chain terminators, in quantities of 1-20 mol %, preferably 2-10 mol %, per mol of bisphenol. Phenol, 4-tert-butyl phenol or cumyl phenol are preferred.

Chain terminators and branching agents may be added to the syntheses either separately or together with the bisphenol.

The production of polycarbonates by the melt interesterification process is described in DE-A 4238 123 by way of example.

Preferred polycarbonates according to the invention for the second layer of the multi-layer products according to the invention are the homopolycarbonate based on bisphenol A, the homopolycarbonate based on 1,1-bis-(4-hydroxyphenyl)-3,3,5-trimethyl cyclohexane and the copolycarbonates based on the two monomers bisphenol A and 1,1-bis-(4-hydroxyphenyl)-3,3,5-trimethyl cyclohexane.

The homopolycarbonate based on bisphenol A is particularly preferred.

The polycarbonate may contain stabilizers. Suitable stabilizers are for example stabilizers containing phosphines, phosphites or Si and other compounds described in EP-A 0 500 496. Triphenyl phosphites, diphenyl alkyl phosphites, phenyl dialkyl phosphites, tris(nonylphenyl) phosphite, tetrakis-(2,4-di-tert-butylphenyl)-4,4'-biphenylene diphosphonite and triaryl phosphite may be cited by way of example. Triphenyl phosphine and tris-(2,4-di-tert-butylphenyl) phosphite are particularly preferred.

The polycarbonate-containing second layer (B) of the multi-layer product according to the invention may also contain 0.01 to 0.5 wt. % of the esters or partial esters of monohydric to hexahydric alcohols, in particular of glycerol, pentaerythritol or guerbet alcohols.

Monohydric alcohols are for example stearyl alcohol, palmityl alcohol and guerbet alcohols.

An example of a dihydric alcohol is glycol.

An example of a trihydric alcohol is glycerol.

Examples of tetrahydric alcohols are pentaerythritol and mesoerythritol.

Examples of pentahydric alcohols are arabitol, ribitol and xylitol.

Examples of hexahydric alcohols are mannitol, glucitol (sorbitol) and dulcitol.

The esters are preferably the monoesters, diesters, triesters, tetraesters, pentaesters and hexaesters or mixtures thereof, in particular random mixtures, of saturated, aliphatic $C_{10}$ to $C_{36}$ monocarboxylic acids and optionally hydroxy monocarboxylic acids, preferably with saturated, aliphatic $C_{14}$ to $C_{32}$ monocarboxylic acids and optionally hydroxy monocarboxylic acids.

The commercially obtainable fatty acid esters, in particular of pentaerythritol and glycerol, may contain <60% of various partial esters as a consequence of their manufacturing process.

Saturated, aliphatic monocarboxylic acids having 10 to 36 C atoms are for example decanoic acid, dodecanoic acid, tetradecanoic acid, hexadecanoic acid, stearic acid, hydroxystearic acid, eicosanoic acid, docosanoic acid, tetracosanoic acid, hexacosanoic acid and octacosanoic acids.

Preferred saturated, aliphatic monocarboxylic acids having 14 to 22 C atoms are for example tetradecanoic acid, hexadecanoic acid, stearic acid, hydroxystearic acid, eicosanoic acid and docosanoic acid.

Saturated, aliphatic monocarboxylic acids such as hexadecanoic acid, stearic acid and hydroxystearic acid are particularly preferred.

The saturated aliphatic $C_{10}$ to $C_{36}$ carboxylic acids and the fatty acid esters are either known per se from the literature or may be produced by methods known from the literature. Examples of pentaerythritol fatty acid esters are those of the particularly preferred monocarboxylic acids specified above.

Esters of pentaerythritol and of glycerol with stearic acid and hexadecanoic acid are particularly preferred.

Esters of guerbet alcohols and of glycerol with stearic acid and hexadecanoic acid and optionally with hydroxystearic acid are also particularly preferred.

The multi-layer products according to the invention may contain organic dyes, inorganic coloured pigments, fluorescent dyes and particularly preferably optical brighteners.

The UV protection layers (A) and (C) according to the invention are produced either by producing a compound (a) from (a1) a polyalkyl (meth)acrylate that contains alkyl methacrylate and/or alkylacrylate, preferably having alkyl chain lengths of less than 10 carbon atoms (—$C_nH_{2n+1}$ with n <10), most preferably with n=1 (methyl methacrylate) and (a2) a biphenyl-substituted triazine having the general formula (I). The compound (a) is then either (i) coextruded with polycarbonate such that a thin UV protection layer comprising compound (a) is firmly bonded to the polycarbonate surface or (ii) compound (a) is further processed to form a thin film which is then back molded or laminated with polycarbonate to form a firmly adhering composite.

Alternatively, the UV protection layers (A) and (C) according to the invention may be produced by incorporating (b2) a biphenyl-substituted triazine having the general formula (I) into a paint formulation (b) containing (b1) a polyacrylate resin, containing methyl methacrylate as the main component and optionally a further alkyl methacrylate having a longer, linear or branched alkyl chain (—$C_nH_{2n+1}$ with n>1), preferably $1 \leq n \leq 10$, particularly preferably linear with n=3 (butyl methacrylate) and one or more solvents, and optionally other paint additives such as e.g. fillers, flow control agents, scavenger, etc. The UV absorber-containing paint formulation (b) is then applied to the surface of a polycarbonate molded part by flow coating, dipping, spraying, rolling or spinning and then physically dried, so that a firmly adhering coating on PC is produced.

A further advantage of the multi-layer products according to the invention produced in this way is that the UV protection layer may be overcoated with scratch-resistant or abrasion-resistant coating systems. To this end a formulation of a scratch-resistant or abrasion-resistant paint, for example a polysiloxane paint, a silicate coating (water glass), or a nanoparticle-containing formulation, is applied to the surface of the UV protection layer by flow coating, dipping, spraying, rolling or spinning and then cured to form a firmly adhering PC/UV protection layer/scratch-resistant layer composite.

The preferred multi-layer products are selected from the group consisting of sheets, films and three-dimensional molded parts.

The present invention also provides the use of said multi-layer products in particular for outdoor applications with high requirements in terms of long-term transparency, such as glazing applications for example.

The invention is further illustrated by the following examples, without being limited thereto. The examples according to the invention merely describe preferred embodiments of the present invention.

EXAMPLES

Example 1

Bisphenol A polycarbonate (type Makrolon 2808 (medium-viscosity BPA-PC (MFR 10 g/10 min according to ISO 1133 at 300° C. and 1.2 kg), without UV stabilization) coated with a UV protection layer containing CGL 479 from Ciba Specialty Chemicals (biphenyl-substituted triazine having formula I with X=OCH(CH3)COOC8H17) in a PMMA paint matrix Production of the Paint Formulation:

In order to determine the solids content of the varnish formulation used, 4 g of a polymethacrylate containing 92 wt. % methyl methacrylate and 8 wt. % butyl methacrylate (determined by $^1$H-NMR, Mw=41.5 kg/mol determined by GPC calibrated on PS) dissolved in a mixture of ethyl acetate, methoxypropanol, diacetone alcohol and butanone was concentrated to small volume with 2 g of a solvent blend comprising ethyl acetate, butanol and methoxypropanol used as thinner for 1 h at 100° C. and the remaining solids were weighed. The 0.874 g obtained correspond to a solids content of 14.56%.

0.874 g of CGL 479 (corresponding to 10 wt. % relative to the solids content of the paint without UV absorber) were added to 20 g of the solvent blend used as thinner (see above) and stirred for approximately 5 minutes at room temperature. 40 g of the dissolved polymethacrylate (see above) were added to this homogeneous solution and the mixture stirred again for approximately 5 minutes at room temperature, producing the ready-for-use homogeneous UV protection paint formulation.

Coating of the Substrates with the UV Protection Paint Formulation:

The injection-molded optical-grade polycarbonate sheets that were used, contained Makrolon 2808 and measuring 10×15×0.32 cm, were cleaned, dried and blown off with ionized air. The UV protection paint formulation was then applied by flow coating, the solvent allowed to evaporate and the coating then cured for 30 min at 50° C. in a circulating air drying oven. The thickness of the transparent coating thus obtained was determined using an Eta SD 30 from Eta Optik GmbH as 7 to 10 μm along the sheet in the direction of flow.

Assessment of the Adhesion of the UV Protection Layer to the PC Substrate:

The following adhesion tests were performed: a.) adhesive tape method (adhesive tape used 3M 898) with and without cross-hatching (as described in ISO 2409 and ASTM D 3359); b.) adhesive tape method after storage for 4 h in boiling water; c.) adhesive tape method after storage for 10 days in water heated to approx. 65° C. (as described in ISO 2812-2 and ASTM 870-02), and all were passed, in other words no tearing off of the coating occurred (rating 0 according to ISO 2409 and 5B according to ASTM D 3359).

Determination of the UV absorber degradation of CGL 479 in the prepared UV protection layer on Makrolon 2808 in an Atlas Ci 5000 Weatherometer with a radiation intensity of 0.75 W/m²/nm at 340 nm and a dry/rain cycle of 102:18 minutes:

The initial extinction (absorbance) of the coating from Example 1 at 340 nm is 5.0 with a degradation of 0.049 MJ$^{-1}$. This produced a UV filter effect for this UV protection layer of well over 30 MJ/m² at 340 nm (corresponding to 10 years' Florida) or extrapolated to a yellowing increase after 30 MJ/m² at 340 nm for polycarbonate of type AL 2647 (medium-viscosity bisphenol A polycarbonate with UV stabilizer and mold release agent; MFR 13 g/10 min according to ISO 1133 at 300° C. and 1.2 kg) of $\Delta$YI equals 0.1, thus meeting the requirement according to the invention of achieving a $\Delta$YI of no more than 3 units after 10 years' Florida.

The yellowness index is calculated as follows: first of all the wavelength-dependent yellowing of the material is determined using the spectral sensitivity method (Interpretation of the spectral sensitivity and of the activation spectrum of polymers, P. Trubiroha, Tagungsband der XXII. Donauländergespräache, 17.8.2001, Berlin, page 4-1). The spectral distribution of solar UV light behind the UV protection layer is then calculated. From these two data sets the yellowing after weathering may be determined in the known way by convolution and integration over time (Grundsätzliches zur Lebensdauervorhersage in der Bewitterung, A. Geburtig, V. Wachtendorf, Tagungsband 34. Jahrestagung der Gesellschaft für Umweltsimulation, Umwelteinflüsse erfassen, simulieren und bewerten, 2.3.2005, Pfinztal, page 159).

Knowing the spectral sensitivity SR, the yellowing during weathering can be calculated with the following formula:

$$\Delta YI = \int_0^T \int_{280nm}^{400nm} \Gamma(\lambda) * 10^{-Ext(\lambda,t)} * SR(\lambda, YI) d\lambda dt$$

Where $\Delta$YI is the change in yellowness index of the substrate material that must be protected by the UV-absorber. T is the weathering time and $\Gamma$ the weathering spectrum. Ext($\lambda$, t) is the wavelength dependent and with time degrading extinction of the UV-absorber and SR($\lambda$, YI) the wavelength and yellowing dependent spectral sensitivity of the substrate material. With this formula, the yellowing of the substrate material can be calculated. However, since the formula is analytically not solvable it must be calculated numerically.

The combination of UV absorber CGL 479 and paint matrix thus meets the requirements in terms of absorbance and degradation and therefore leads to lower yellowing.

Example 2

Comparative example identical to Example 1 except for the use of a UV absorber not according to the invention (Chimassorb 81). The UV protection layer was produced in the same way as in Example 1, wherein instead of 10 wt. % of CGL 479 relative to the solids content of the paint formulation, 10 wt. % of Chimassorb 81 (2-hydroxy-4-(octyloxy)benzophenone from Ciba Specialty Chemicals) relative to the solids content of the paint formulation were used.

Example 3

Comparative example identical to Example 1 except for the use of too small an amount of the UV absorber CGL 479, only 1 wt. %, for the average film thickness of approx. 8.5 μm. The UV protection layer was produced in the same way as in Example 1, wherein instead of 10 wt. % of CGL 479 relative to the solids content of the paint formulation, only 1 wt. % of CGL 479 relative to the solids content of the paint formulation was used.

Example 4

Example identical to Example 3 apart from the additional use of the HALS system Tinuvin 123 (bis-(1-octyloxy-2,2,6,6-tetramethyl-4-piperidyl) decanedioic acid ester, formula IId with n=8 and $R^1$=C8H17 from Ciba Specialty Chemicals). Through the additional stabilisation of the UV absorber CGL 479 achieved in this way, despite the amount of UV absorber of only 1 wt. % which on its own is too small for the average film thickness of approx. 8.5 μm, a formulation according to the invention is once more achieved with corresponding long-term stability.

Coating of the PC Substrates with the Paint Formulation:

The injection-molded optical-grade polycarbonate sheets that were used, containing Makrolon 2808 and measuring 10×15×0.32 cm, were cleaned, dried and blown off with ionised air. The paint formulation was then applied using a coating knife and the solvent was allowed to evaporate from the coating at room temperature until it was dry. The thickness of the transparent coating thus obtained was determined using an Eta SD 30 from Eta Optik GmbH as approximately 23 μm.

The UV absorber degradation rate was determined in the same way as described in Example 1. The initial absorbance of the coating from Example 5 is 1.3 at 340 nm with a degradation of 0.096 $MJ^{-1}$, which is over 4 times higher than in Example 3, which has a comparable initial absorbance. This means that with this protection layer a UV filter effect for only 12 $MJ/m^2$ is obtained. Extrapolated to a yellowing increase after 30 $MJ/m^2$ at 340 nm (corresponding to 10 years' Florida) for polycarbonate of type AL 2647 (see Example 1), this gives a $\Delta YI$ value of 18.1, which means that the requirements according to the invention are not met.

Example 6

Structure: Bisphenol A polycarbonate (type Makrolon AL 2647 (medium-viscosity bisphenol A polycarbonate with UV stabilizer and mold release agent; MFR 13 g/10 min according to ISO 1133 at 300° C. and 1.2 kg))/UV protection layer

| Example no. | UV absorber | Initial absorbance at 340 nm | Degradation in $MJ^{-1}$ | Comment |
| --- | --- | --- | --- | --- |
| 1 | 10 wt. % CGL 479 | 5.0 | 0.049 | UV filter effect for >>30 $MJ/m^2$ at 340 nm, corresponding to a $\Delta YI$ of 0.1 after the equivalent of 10 years' weathering in Florida |
| 2 (comp. example) | 10 wt. % Chimassorb 81 | 3.0 | 0.18 | UV filter effect for approx. 20 $MJ/m^2$ at 340 nm, corresponding to a $\Delta YI$ of 12.6 after the equivalent of 10 years' weathering in Florida |
| 3 (comp. example) | 1 wt. % CGL 479 | 1.0 | 0.022 | UV filter effect for approx. 21 $MJ/m^2$ at 340 nm, corresponding to a $\Delta YI$ of 5.0 after the equivalent of 10 years' weathering in Florida |
| 4 | 1 wt. % CGL 479 + 1 wt. % Tinuvin 123 | 1.1 | <0.001 | UV filter effect for approx. 30 $MJ/m^2$ at 340 nm, corresponding to a $\Delta YI$ of 1.8 after the equivalent of 10 years' weathering in Florida |

Example 5

The use of the UV absorber CGL 479 in a paint formulation based on polycarbonate, applied to and cured on a PC substrate, led to a PC surface with a high UV absorber content and revealed through the experimentally determined, unsatisfactory UV filter effect the importance of the paint matrix for the structure of a UV protection layer according to the invention.

Production of the Paint Formulation:

25 g of bisphenol A polycarbonate (type Makrolon 2808) were dissolved in 75 g of methylene chloride and 125 mg of CGL 479 (0.5 wt. % relative to the solids content of the paint formulation) from Ciba Specialty Chemicals (biphenyl-substituted triazine having formula I with X=OCH(CH3)COOC8H17) were added.

with CGL 479 as UV absorber in a PMMA paint matrix/abrasion-resistant topcoat based on a siloxane paint.

Production of the Paint Formulation:

As described in Example 1, the solids content of the paint containing a 2 to 1 mix of the dissolved polymethacrylate from Example 1 and the solvent blend (again see Example 1) used as thinner was first determined, in this case as 13.23%.

6 g of the solvent blend used as thinner (see Example 1) are added to 12 g of the dissolved polymethacrylate (again see Example 1) and the mixture stirred for approx. 5 min. 0.119 g CGL 479 (corresponding to 5 wt. % relative to the solids content without UV absorber as determined above), 0.024 g of a HALS system (Tin. 123 (bis-(1-octyloxy-2,2,6,6-tetramethyl-4-piperidyl) decanedioic acid ester, formula IId with n=8 and $R^1$=C8H17 from Ciba Specialty Chemicals (corresponding to 1 wt. % relative to the solids content without the further additions as determined above), and 0.091 g of a flow control agent (BYK 347 from BYK-Chemie GmbH) (corresponding to 0.5 wt. % relative to the total amount of paint without flow control agent) are added to this homogeneous solution one at a time. After stirring for a further approx. 5 minutes, the paint formulation is ready for use.

Coating of the Substrates with the UV Protection Paint Formulation:

The injection-molded optical-grade polycarbonate sheets that were used, containing Makrolon AL 2647 (see above) and measuring 10×15×0.32 cm, were cleaned, coated with the paint formulation above and then cured.

Overcoating of the UV Protection Layer with an Abrasion-Resistant Topcoat:

The siloxane paint (Silvue MP 100) from SDC Technologie Inc. stored in the refrigerator at approx. 8° C. is brought up to room temperature while being stirred. The AL 2647 sheets coated with the UV protection layer are blown off on the coated side with ionized air, overcoated with the Silvue MP 100 paint by the flow coating method in the same direction of flow as the UV protection paint, then the solvent is allowed to evaporate and the coating is then cured for 1 h at 100° C. in a circulating air drying oven. The total thickness of the optically perfect, transparent two-layer coating thus obtained, comprising UV protection layer and topcoat, was determined using an Eta SD 30 from Eta Optik GmbH as 8 to 14 μm along the sheet in the direction of flow.

Assessment of the Adhesion of the PC/UV Protection Layer/Topcoat:

The adhesion of the Makrolon AL 2647/UV protection layer/Silvue MP 100 structure was tested using the three methods described in Example 1 and passed.

Example 7

Coextruded films with the structure bisphenol A polycarbonate (type Makrolon 3108 (high-viscosity BPA-PC (MFR 6.5 g/10 min according to ISO 1133 at 300° C. and 1.2 kg) without UV stabilization))/UV protection coex layer containing CGX UVA 006 from Ciba Specialty Chemicals (biphenyl-substituted triazine having formula I with X=OCH2CH(CH2CH3)C4H9) in a PMMA matrix containing Plexiglas 8H (PMMA with a Mw of 103.5 kg/mol determined by GPC calibrated on PS) from Röhm GmbH & Co. KG.

Production of the UV Protection Compound:

750 g of the UV absorber CGX UVA 006 (corresponding to 5 wt. %) were metered into 14.25 kg of Plexiglas 8H, predried for 3 h at 100° C., on a twin-screw extruder (ZSK 32/3) at a speed of 150 rpm. The melt temperature was 260° C. and the granules obtained were clear and transparent.

Production of the Coex Film:

For production of the one-sided coex film the base material Makrolon 3108 was melted on the main extruder (speed 65.7 rpm, melt temperature 296° C. and melt pressure 99 bar) after being predried (4 h at 120° C.). From the other side the coex material containing the UV protection compound (see above), predried for 3 h at 100° C., was supplied via a coextruder (speed 10 rpm, melt temperature 286° C. and melt pressure 54 bar) and transferred together with the base material through a sheet nozzle to the gap between two embossing rolls. The coex film thus obtained had a base material thickness of approximately 400 μm and a UV coex protection layer of approximately 10 μm.

The UV absorber degradation of CGX UVA 006 in the UV coextruded protection layer on Makrolon 3108 was determined as described in Example 1. The initial absorbance of the coex layer is 3.3 at 340 nm, with a degradation of 0.036 MJ$^{-1}$, and it therefore offers a UV protection effect for >30 MJ/m$^2$ at 340 nm, which means that this UV protection layer satisfies the requirements according to the invention in terms of long-term stability. Extrapolated to a yellowing increase after 30 MJ/m$^2$ at 340 nm (corresponding to 10 years' Florida) for polycarbonate of type AL 2647 (see Example 1) this gives a ΔYI value of 0.5.

Example 8

Comparative example similar to Example 7, but using a matrix not according to the invention for the UV coex layer containing Plexiglas HW55 (copolymer containing 83 wt. % methyl methacrylate with 17 wt. % styrene determined by $^1$H-NMR; Mw=146.8 kg/mol determined by GPC calibrated on PS).

The initial absorbance of this coex layer containing Plexiglas HW55 with 5 wt. % CGX UVA 006 produced in the same way as for Example 7 is 3.7 at 340 nm, with a degradation of 0.19 MJ$^{-1}$, and it therefore offers a UV protection effect of only 21 MJ/m$^2$ at 340 nm and, extrapolated to a yellowing increase after 30 MJ/m2 at 340 nm (corresponding to 10 years' Florida) for polycarbonate of type AL 2647 (see Example 1), a Δ YI value of 8.3, which means that this UV protection layer does not meet the requirements according to the invention in terms of long-term stability.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. Multi-layered product comprising a first layer (A) having a thickness of 1 μm to 2 mm consisting essentially of (co)polyalkyl (meth)acrylate and 0.01 to 20 percent relative to the weight of said first layer of a UV stabilizer and a second layer (B) that contains polycarbonate, said stabilizer conforming to formula (I)

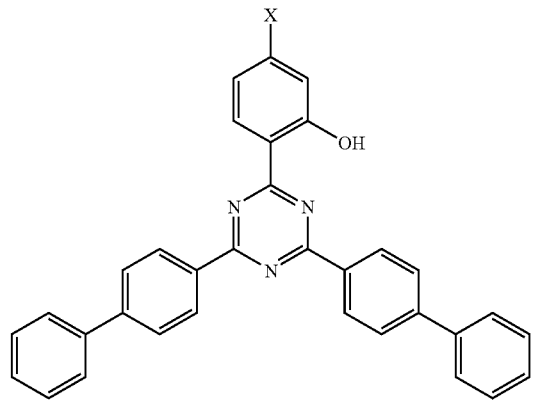

wherein X denotes OR$^1$; OCH$_2$CH$_2$OR$^1$; OCH$^2$CH(OH)CH$_2$OR$^1$ or OCH(R$^2$)COOR$^3$, R$^1$ is branched or unbranched C$_1$-C$_{13}$ alkyl, C$_2$-C$_{20}$ alkenyl, C$_6$-C$_{12}$ aryl or —CO—C$_1$-C$_{18}$ alkyl, R$^2$ is H or branched or unbranched C$_1$-C$_8$ alkyl, and R$^3$ is C$_1$-C$_{12}$ alkyl; C$_2$-C$_{12}$ alkenyl or C$_5$-C$_6$ cycloalkyl, said product characterized in that under irradiation of 30MJ/m$^2$ at 340 nm it does not yellow by more than ΔYI of 3.

2. The product of claim 1, wherein layer (A) is 1 to 100 μm in thickness.

3. The product of claim 2 wherein said UV stabilizer is present at an amount of 0.5 to 20 percent.

4. The product of claim 1 wherein layers (A) and (B) are coextruded.

5. Multi-layer product according to claim 1, wherein layer (A) is a cured paint formulation having a film thickness of 1 to 100 μm and the proportion of UV absorber having formula (I) is 0.5 to 20 wt. % relative to layer (A).

6. The product according to claim 5 wherein said layer (A) further contains up to 5 percent relative to its weight a stabilizer conforming to formula (II)

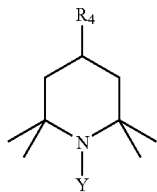

(II)

wherein Y denotes H; $R^1$ or $OR^1$ and $R^4$ denotes $-Z-R^5-Z-R^6$ or

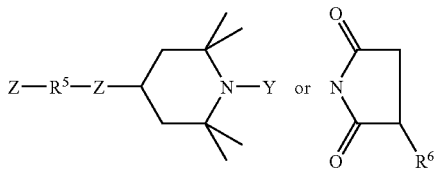

wherein
Z is a divalent functional group,
$R^5$ is a divalent organic radical,
$R^6$ is H or $C_1$-$C_{20}$ alkyl.

7. The product of claim 6 wherein said Z denotes COO; NH or NHCO.

8. The product of claim 6 wherein said $R^5$ denotes $(CH_2)_n$ where n is 0 to 12; C=CH-Ph-OCH$_3$;

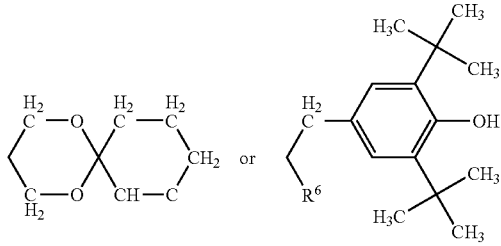

9. The product of claim 5, wherein layer (A) further contains 0.5 to 2 percent relative to its weight of a stabilizer conforming to formula (II)

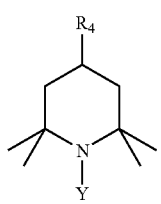

(II)

wherein Y denotes H; $R^1$ or $OR^1$ and $R^4$ denotes $-Z-R^5-Z-R^6$ or

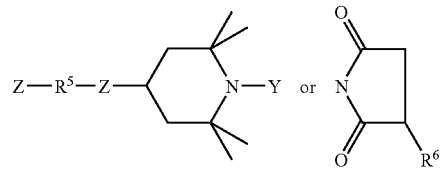

where Z is a divalent functional group, $R^5$ is a divalent organic radical, $R^6$ is H or $C_1$-$C_{20}$ alkyl.

10. Multi-layer product according to claim 5, characterised in that layer (A) contains 0.5 to 2 wt. %, relative to layer (A), of a stabiliser having formula (II)

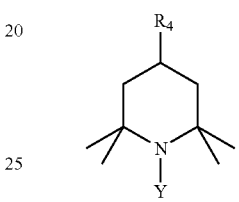

(II)

wherein Y and $R^4$ have the same meaning as in claim 5.

11. Multi-layer product according to claim 5, selected from the group comprising sheets, films and three-dimensional moulded parts.

12. Multi-layer product according to one of claim 5, which optionally further contains an additional layer (C), wherein layer (C) is a UV protection layer consisting of polyalkyl (meth)acrylate having a film thickness of 1 μm to 2 mm, containing 0.01 to 20 percent by weight (relative to (C) of a IV stabiliser according to formula (I)

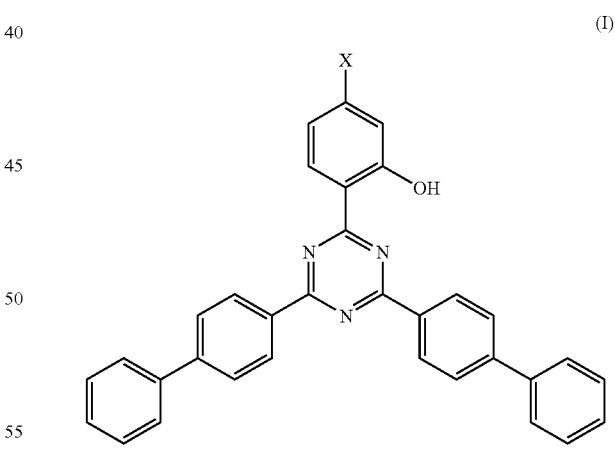

(I)

wherein X denotes $OR^1$; $OCH_2CH_2OR^1$; $OCH_2CH(OH)CH_2OR^1$ or $OCH(R^2)COOR^3$, wherein $R^1$ stands for branched or unbranched $C_1$-$C_{13}$ alkyl, $C_2$-$C_{20}$ alkenyl, $C_6$-$C_{12}$ aryl or —CO—$C_1$-$C_{18}$ alkyl, $R^2$ stands for H or branched or unbranched $C_1C_8$ alkyl, and $R^3$ is $C_1$-$C_{12}$ alkyl; $C_2C_{12}$ alkenyl or $C_5C_6$ cycloalky, characterised in that it comprises a paint coat based on a polysiloxane paint, a silicate coating or a nanoparticle-containing formulation on layer (A) (and optionally on layer (C) or layer (B)).

13. Multi-layer product according to claim 1, wherein layer (A) is a coextruded layer having a film thickness of 1 to 500

μm and the proportion of UV absorber having formula (I) is 0.05 to 20 wt. % relative to layer (A).

14. Multi-layer product according to claim 13, selected from the group comprising sheets, films and three-dimensional moulded parts.

15. Multi-layer product according to one of claim 13, which optionally further contains an additional layer (C), wherein layer (C) is a UV protection layer consisting of polyalkyl (meth)acrylate having a film thickness of 1 μm to 2 mm, containing 0.01 to 20 percent by weight (relative to (C) of a UV stabiliser according to formula (I)

(I)

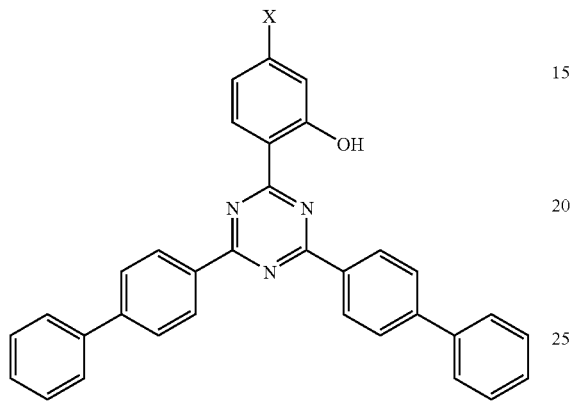

wherein X demotes $OR^1$; $OCH_2CH_2OR^1$; $OCH_2CH(OH)CH_2OR^1$ or $OCH(R^2)COOR^3$, wherein $R^1$ stands for brached or unbranched $C_1$-$C_{13}$ alkyl, $C_2$-$C_{20}$ alkenyl, $C_6$-$C_{12}$ aryl or —CO-$C_1$-$C_{18}$ alkyl, $R^2$ stands for H brached or unbranched $C_1$-$C_8$ alkyl, and $R^3$ is $C_1$-$C_{12}$ alkyl; $C_2$-$C_{12}$ alkenyl or $C_5$-$C_6$ cycloalky, and characterised in that it comprises a paint coat based on a polysiloxane paint, a silicate coating or a nanoparticle-containing formulation on layer (A) (and optionally on layer (C) or layer (B)).

16. Multi-layer product according to claim 1, wherein layer (A) is a film having a film thickness of 2 μm to 2 mm and the proportion of UV absorber having formula (I) is 0.01 to 20 wt. % relative to layer (A).

17. Multi-layer product according to claim 16, selected from the group comprising sheets, films and three-dimensional moulded parts.

18. Multi-layer product according to one of claim 16, which optionally futher contains an additional layer (C), wherein layer (C) is a UV protection layer consisting of polyalkyl (meth)acrylate having a film thickness of 1 μm to 2 mm, containing 0.01 to 20 percent by weight (relative to (C) of a UV stabiliser according to formula (I)

(I)

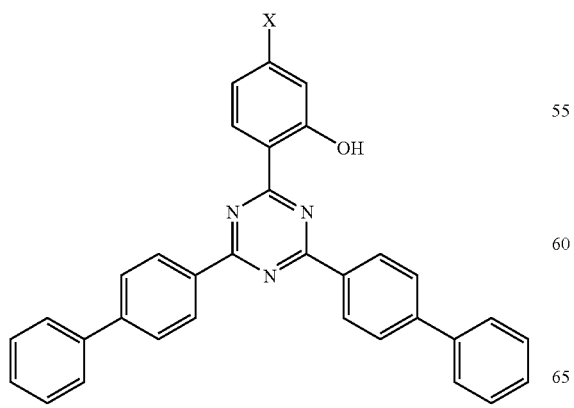

wherein X denotes $OR^1$; $OCH_2CH_2OR^1$; $OCH_2CH(OH)CH_2OR^1$ or $OCH(R^2)COOR^3$, wherein $R^1$ stands for branched or unbanched $C_1$-$C_{13}$ alkyl, $C_2$-$C_{20}$ alkenyl, $C_6$-$C_{12}$ aryl or —CO—$C_1$-$C_{18}$ alkyl, $R^2$ stands for H or branched or unbranched $C_1$-$C_8$ alkyl, and $R^3$ is $C_1$-$C_{12}$ alkyl; $C_2$-$C_{12}$ alkenyl or $C_5$-$C_6$ cycloalky, and characterised in that it comprises a paint coat based on a polysiloxane paint, a silicate coating or a nanoparticle-containing formulation on layer (A) (and optionally on layer (C) or layer (B)).

19. Multi-layer product according to claim 1, characterised in that it exhibits an additional layer (C), wherein layer (C) is a UV protection layer consisting of polyalkyl (meth)acrylate having a film thickness of 1 μm to 2 mm, containing 0.01 to 20 percent by weight (relative to (C) of a UV stabiliser according to formula (I)

(I)

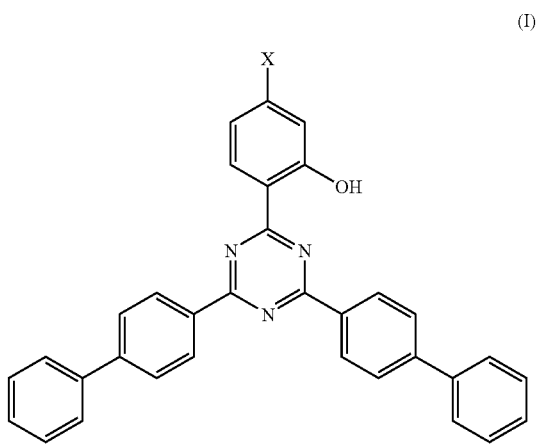

wherein X denotes $OR^1$; $OCH_2CH_2OR^1$; $OCH_2CH(OH)CH_2OR^1$ or $OCH(R^2)COOR^3$, wherein $R^1$ stands for branched or unbranched $C_1$-$C_{13}$ alkyl, $C_2$-$C_{20}$ alkenyl, $C_6$-$C_{12}$ aryl or —CO—$C_1$-$C_{18}$ alkyl, $R^2$ stands for H or branched or unbranched $C_1$-$C_8$ alkyl, and $R^3$ is $C_1$-$C_{12}$ alkyl; $C_2$-$C_{,12}$ alkenyl or $C_5$-$C_6$ cycloalky, and the layer sequence is (A)-(B)-(C).

20. Multi-layer product according to claim 19, characterised in that it comprises a paint coat based on a polysiloxane paint, a silicate coating or a nanoparticle-containing formulation on layer (A) (and optionally on layer (B)).

21. Multi-layer product according to claim 1, selected from the group comprising sheets, films and three-dimensional moulded parts.

* * * * *